E. T. GILLILAND.
TELEPHONIC REPEATER.

No. 247,631. Patented Sept. 27, 1881.

WITNESSES.
James B. Lizius.
R. P. Daggett

INVENTOR.
Ezra T. Gilliland,
PER
C. Bradford,
ATTORNEY.

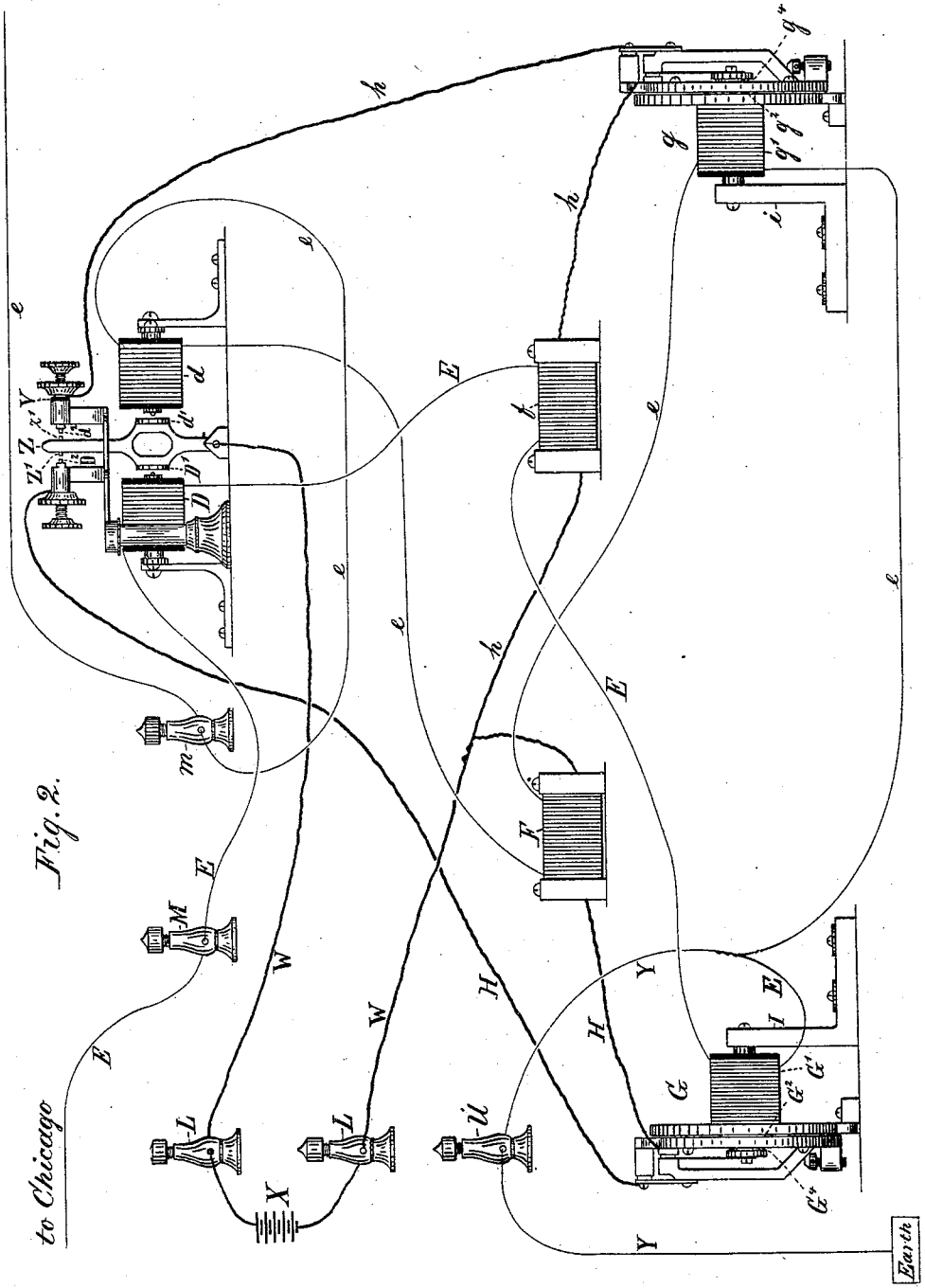

E. T. GILLILAND.
TELEPHONIC REPEATER.
No. 247,631. Patented Sept. 27, 1881.
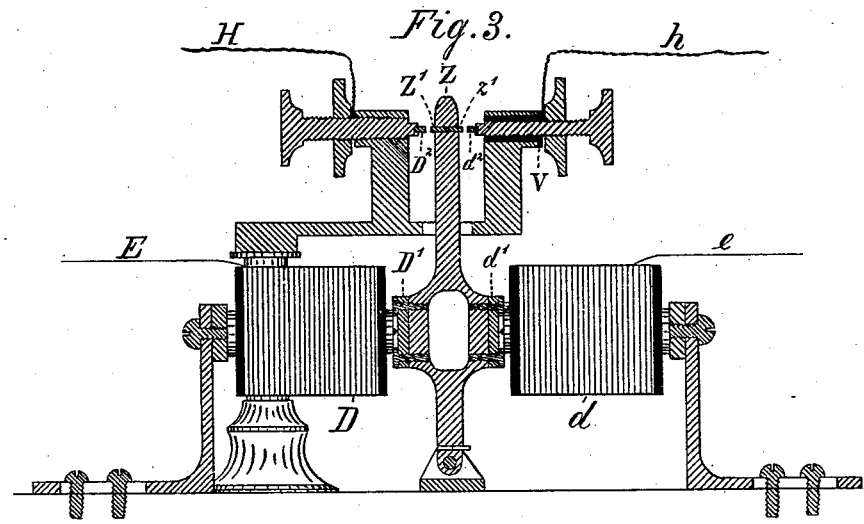
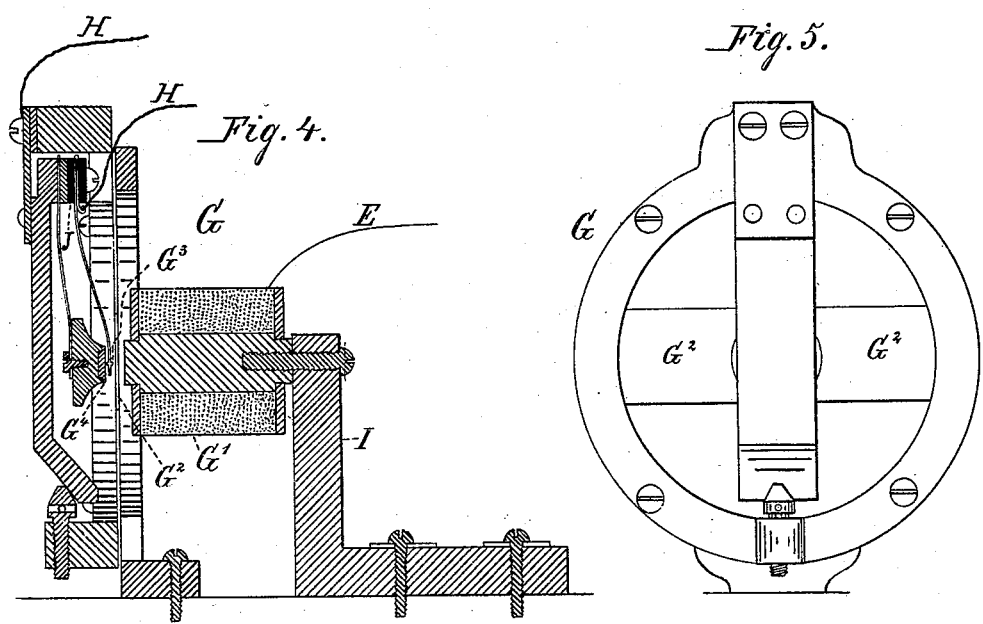
WITNESSES.
James B. Legius.
R. P. Daggett.
INVENTOR.
Ezra T. Gilliland,
PER
C. Bradford
ATTORNEY.

E. T. GILLILAND.
TELEPHONIC REPEATER.
No. 247,631. Patented Sept. 27, 1881.
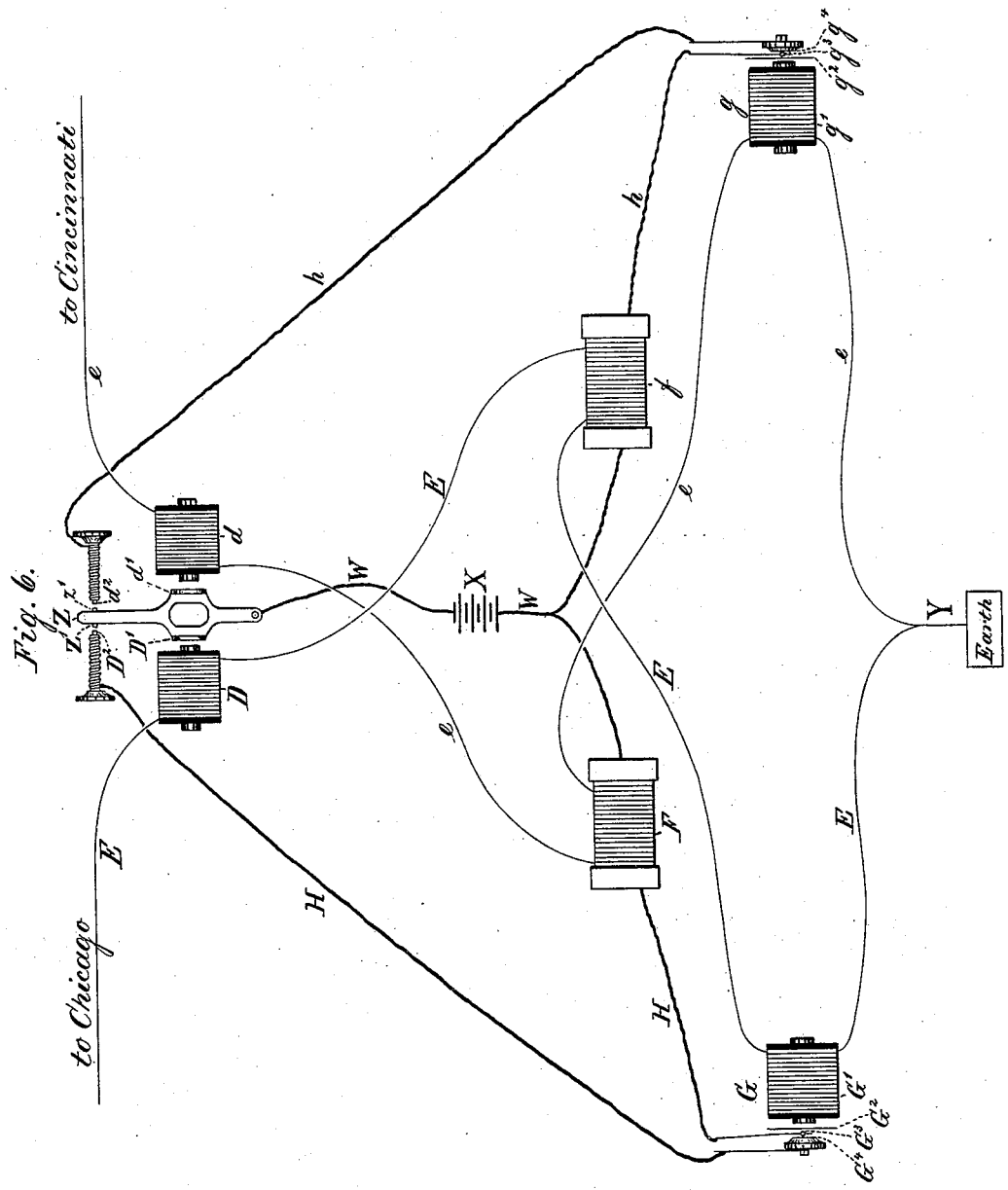
WITNESSES.
James B. Lizius.
R. P. Daggett
INVENTOR.
Ezra T. Gilliland,
PER
C. Bradford
ATTORNEY.

E. T. GILLILAND.
TELEPHONIC REPEATER.

No. 247,631. Patented Sept. 27, 1881.

5 Sheets—Sheet 5.

UNITED STATES PATENT OFFICE.

EZRA T. GILLILAND, OF INDIANAPOLIS, INDIANA, ASSIGNOR OF TWO-THIRDS TO WILLIAM H. MORRISON, WILLIAM O. ROCKWOOD, AND CHARLES B. ROCKWOOD, OF SAME PLACE.

TELEPHONIC REPEATER.

SPECIFICATION forming part of Letters Patent No. 247,631, dated September 27, 1881.

Application filed July 5, 1879.

*To all whom it may concern:*

Be it known that I, EZRA T. GILLILAND, of the city of Indianapolis, county of Marion, and State of Indiana, have invented certain new and useful Improvements in Reproducers of Undulatory Electric Waves or Telephone-Repeaters, of which the following is a specification, reference being had to the accompanying drawings, which are made a part hereof, and on which similar letters of reference indicate similar parts.

Figure 1:
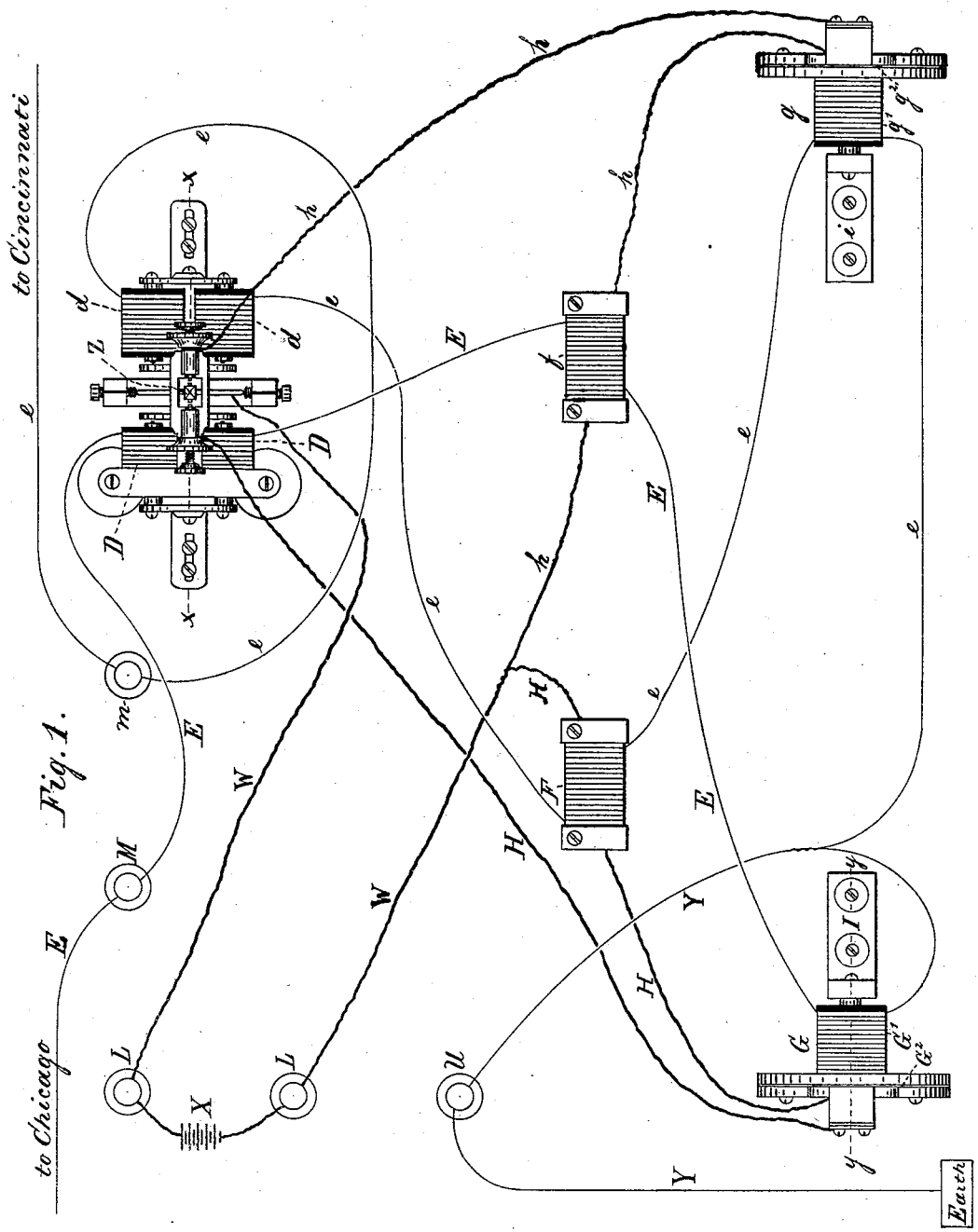
Figure 7:
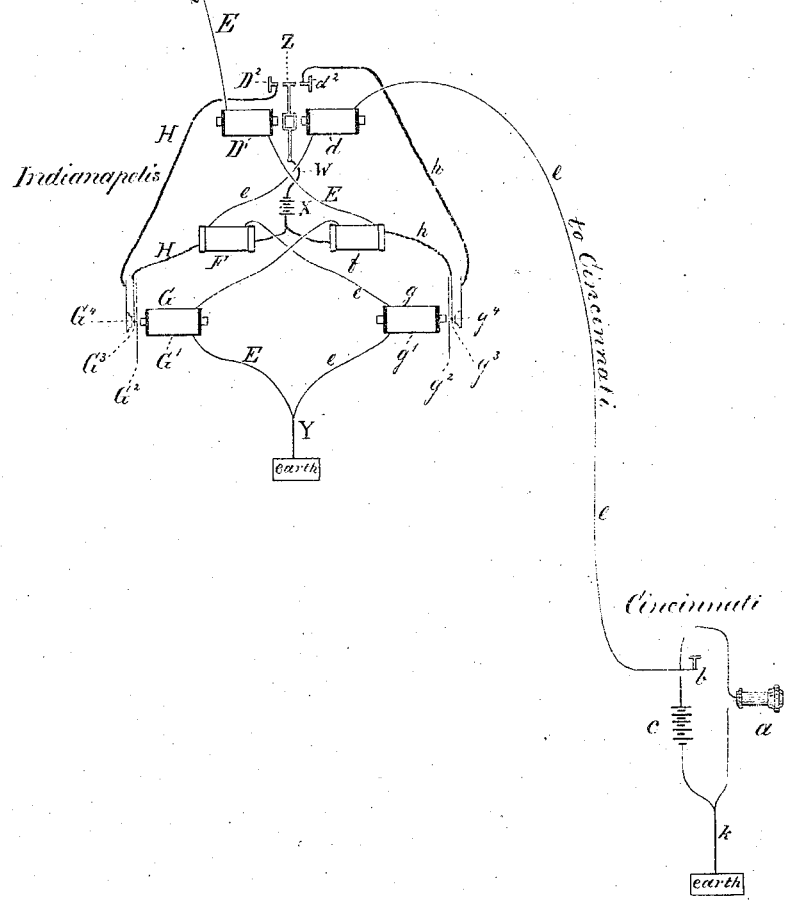

Figure 1 is a plan view of all the instruments and parts which are employed in my invention at the repeating-station. Fig. 2 is a side elevation of the same devices shown in Fig. 1. Fig. 3 is a longitudinal vertical section of the electric switch used in connection with my invention on the dotted line *x x* in Fig. 1. Fig. 4 is a longitudinal vertical section of the repeater proper on the dotted line *y y* in Fig. 1. Fig. 5 is an end elevation of the same instrument of which Fig. 4 is a section. Fig. 6 is a plan of the various wires commonly used in connection with this invention, and is similar in some respects to Fig. 2, but in which (as illustrating the proper running of the lines of wire is the only object) many of the details of the instrument mechanism are lacking, and all of the supporting frame-work, or, as far as possible, all non-electrical matters. Fig. 7 is a plan of a telephone-line too long to be successfully operated in a single circuit, similar in detail to Fig. 6.

In all the drawings in which the various lines of wire are wholly or partly represented "local" are distinguished from "main" lines by being drawn heavier and less evenly.

The object of my invention is to repeat or reproduce the electric waves or impulses caused by the voice or other sounds spoken into a telephonic transmitter when the distance which can be safely operated in a single circuit has been reached in another circuit, in order that they may travel a still farther distance, said invention bearing substantially the same relation to telephony that the electric repeater now in use does to ordinary telegraphy.

To accomplish this object it is necessary to combine in a single instrument, which I denominate a "telephonic repeater," an electro-magnet having a movable or vibrating armature and a microphone or carbon or other transmitter.

In the drawings the various portions are designated by letters of reference in the following manner:

As, in order to give a clear idea of the nature and workings of this invention, it is necessary to deal with two electrical circuits, in each of which is a set of instruments substantially identical with that in the other, one circuit is called, for convenience' sake, the "Chicago" or "first" circuit, and the other the "Cincinnati" or "second" circuit. In both these circuits and their respective sets of instruments the same letters of reference are employed to indicate equivalent parts, the only difference being that in the Chicago circuit capital letters are used and in the Cincinnati circuit small letters.

In those cases where the same part bears the same relation to both circuits the last few capital letters of the alphabet, V, W, X, Y, and Z, are employed. Letters having figures attached are used to designate subdivisions of parts, the whole of which the letter alone designates.

Telephones A and *a* (shown only in Fig. 7) are supposed to be located at points too distant from each other to allow of successful communication through the medium of a single electrical circuit. As before stated, for convenience in referring to these points, they are designated as "Chicago" and "Cincinnati," respectively, and the central station, where my repeating-instruments are located, is, for the same reason, designated as "Indianapolis."

Batteries C and *c* are located near the telephones. Switch-keys B and *b* are so arranged as to connect either the telephone or the battery with the main line of wire E or *e*, at the pleasure of the operator. The first connections made by these main lines at the central station are to the electro-magnets D and *d*, located near to and upon opposite sides of the switch Z, in such a position as to, when properly operated upon, draw toward themselves the corresponding armatures D′ and *d*′, thus throwing said switch, to which said armatures are attached, toward the side being used, which puts the points Z' and D² or z' and d² in contact, completing the proper one of the local circuits H and h, and interrupting the other. Said electro-magnets are rendered operative in this connection by the electric current which is sent over the main line of wire from the battery C or c, when connection is made therewith by the proper switch-key, re-enforced by the permanent magnets I or i, which also serves as a mounting for the electro-magnets.

The switch Z is pivoted at its lower end in the manner shown, and is so adjusted that its own weight will cause it to remain in contact with one of the points, D² or d², until drawn to the other by the opposite magnet in the same manner in which it was drawn to the first.

The object of the switch, as above indicated, is to cut off the repeater of the receiving-circuit from the main line of the transmitting-circuit, so that the electric waves produced by the repeater shall not be sent back onto the main line of the transmitting-circuit, and thus interfere with the original electric waves which are being sent over that circuit to the repeater. This may be done either by interrupting the local circuit, as before specified, or by shunting or cutting out the electro-magnet of the repeater of the receiving-circuit.

Supposing that the operator in Chicago desires to communicate direct with Cincinnati, he will first, by means of the switch-key B, throw his main line E in connection with the battery C, and thus render the electro-magnet D on his own side of the switch at Indianapolis operative, which will then, through the armature D', draw the switch Z over until the points Z' and D² are in contact, and the local circuit, in connection with the repeater of his circuit, is complete. He will then disconnect the battery and connect the telephone A with the main line E. This being done, speaking into said telephone A will cause the ordinary telephonic or undulatory electric waves to travel along said main line E of the Chicago circuit to Indianapolis, by which time it will be assumed that they have become so far exhausted as to be practically incapable of further service, and consequently this circuit is terminated in the ordinary manner. Before reaching the ground-line Y, however, this wire makes connections as follows: first with the electro-magnet D on its own side of the switch Z, as before stated; then with the secondary coil of the induction-coil f, which is in connection with the repeater g of the Cincinnati circuit; then with the electro-magnet G' of the repeater G of its own circuit. The connection with the electro-magnet D is made so that the switch may be operated in the manner specified, and has no other significance. Were some other means used to operate the switch, this connection would not be made at all. The connection with the induction-coil f is made so that this circuit can be made to receive as well as transmit. If it were only desired to send messages to Cincinnati this connection would also be unnecessary and useless; but that to the electro-magnet G' or the repeater G is, as will now be more fully explained, the means whereby the message is repeated and the electric waves reproduced in the receiving or Cincinnati circuit. The electric current, in passing through the electro-magnet G' of the repeater G, causes a movement (the magnetism which is superinduced by said electric current being the force) corresponding to the undulations of said current in the vibrating armature G², which, in turn, causes corresponding movements in the spring-mounted platina point G³ and the spring-mounted carbon button G⁴, thus also causing a corresponding disturbance of the electric current which is continually flowing from the battery X through the local line H W, and which passes through the primary coil of the induction-coil F.

As is well known to those versed in the science of electricity, a disturbance of the current flowing through the primary coil of an induction-coil produces a current in the secondary coil corresponding to such disturbance, and as the main line e of the Cincinnati circuit is connected to the secondary coil of the induction-coil F, electric waves corresponding to those of the Chicago circuit, but of greatly-increased force, are sent over it, and, reaching and acting upon the telephone a at Cincinnati, are reconverted into sound-waves, and thus the voice of the operator in Chicago is heard in Cincinnati, the same as though the distance were so short that an ordinary line composed of a single circuit could be employed. The switch arrangement which has already been described confines the reproduced waves to the Cincinnati or receiving circuit.

Reversing the switch and talking into the telephone a at the Cincinnati end of the line will constitute the Cincinnati circuit the transmitting-circuit, and the Chicago circuit the receiving-circuit, as each circuit is the counterpart in all things of the other when corresponding electrical connections are made.

It will be understood, of course, that when the frame supporting the points D² d² is constructed as shown in the drawings, one of said points must be insulated. This is done in the present instance by the insulator V. (Shown best in Fig. 3.)

The springs which support the platina points G³ g³ are insulated from the surrounding parts by the insulators J.

All parts of this invention formed of distinctively insulating material are shown in the drawings in solid black.

The line of wire Y is a ground-line common to both of the main lines E and e, and passes through the binding-post U in the ordinary manner.

Those portions of the local circuits marked W are common to both said local circuits, as is the battery X and the binding-posts L L.

M m are the binding-posts for the main lines E e. The insulator V, while apparently altogether upon one side of the switch, is in reality a division of the two sides, as it insulates one of the points $D^2$ $d^2$ from the other.

The operation of my invention may be briefly recapitulated as follows:

In the drawings, Fig. 7, the locations marked "Chicago" and "Cincinnati" represent the ends of a telephone-line too long to be successfully operated in a single circuit, at the ends of which are the ordinary telephones, A a. At a central station marked "Indianapolis" is where each of the circuits starting from the points Chicago and Cincinnati ends, but where, by the use of my invention, the electric waves or impulses sent over one circuit are repeated into or reproduced in the other, and at the same time given substantially the power originally possessed by the originals. Uninterrupted communication may thus be had between the distant telephones A and a.

It will be understood that a second, third, or any number of these repeating-stations may be used, and thus an uninterrupted line of any desired length may be formed.

I do not claim as my invention the combination, with an electro-magnet in one circuit, of an armature and finely-divided conducting material in another circuit, whereby the variable magnetic attractions are translated into electric waves; neither do I claim the transmitter shown, which is substantially of the ordinary well-known form; but,

Having thus fully described my said invention, what I claim as new, and desire to secure by Letters Patent, is—

At the junction of two telephonic circuits, the combination, with the two main lines thereof, of two repeaters, two induction-coils, and two local circuits, each of said main lines running first to the induction-coil connected with the local circuit of the other circuit, and thence to the repeater of its own circuit, substantially as shown and specified.

In witness whereof I have hereunto set my hand and seal, at Indianapolis, Indiana, this 28th day of June, A. D. 1879.

EZRA T. GILLILAND. [L. S.]

In presence of—
 C. BRADFORD,
 CHAS. B. ROCKWOOD.